(No Model.)

G. SCHUETTE.
CHEESE PRESS.

No. 321,857. Patented July 7, 1885.

WITNESSES
Phil. Dietrich
W. J. Smith

INVENTOR
Geo. Schuette
By F. O. M. Cleary
Attorney

UNITED STATES PATENT OFFICE.

GEORGE SCHUETTE, OF MANITOWOC, WISCONSIN.

CHEESE-PRESS.

SPECIFICATION forming part of Letters Patent No. 321,857, dated July 7, 1885.

Application filed March 20, 1885. (No model.)

*To all whom it may concern:*

Be it known that I, GEORGE SCHUETTE, of Manitowoc, in the county of Manitowoc and State of Wisconsin, have invented certain new and useful Improvements in Cheese-Presses; and I do hereby declare the following to be a full, clear, and exact description of the invention, such as will enable others skilled in the art to which it pertains to make and use the same.

My invention relates to cheese-presses, the object being to construct the cylinder of the press in such a manner as to enable it to impart a series of indentations or lines to the cheese during the process of pressing.

The invention consists in providing the interior of a cheese-press cylinder with a series of ribs or projections.

The invention further consists in providing the under surface of the follower of a cheese-press with radially-arranged ribs or projections.

Figure 1:
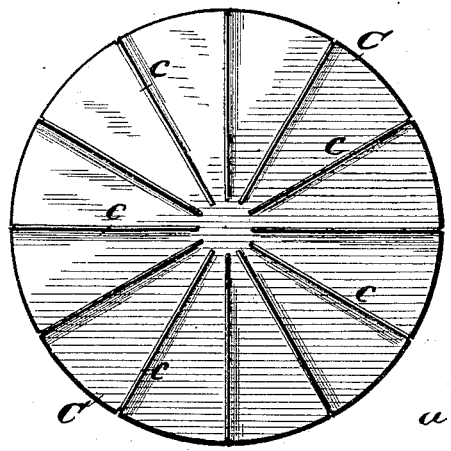
Figure 2:
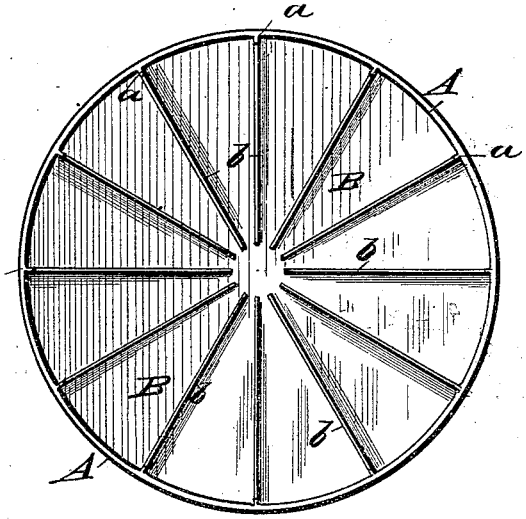
Figure 3:
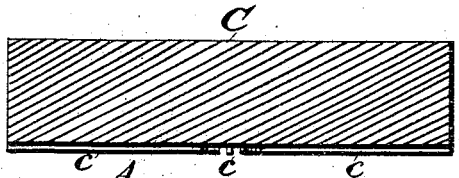
Figure 4:
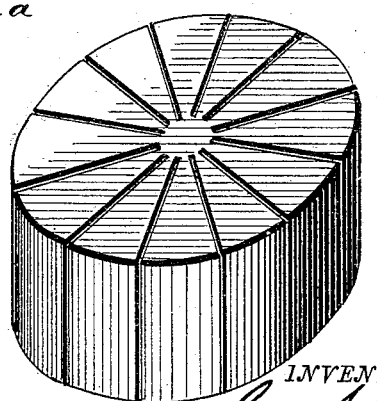

In the accompanying drawings, Figure 1 illustrates the under side of a follower constructed in accordance with my invention. Fig. 2 is a plan view of a press cylinder showing a series of vertical ribs. Fig. 3 is a sectional view of a press-cylinder and follower; and Fig. 4 represents a cheese after its removal from the press.

A represents the cylinder provided on its interior with a series of vertical ribs, *a*. The bottom B of the cylinder is formed with a series of radial ribs, *b*, which register with the vertical ribs *a*. The under side of the follower C is formed with a series of radial ribs, *c*, which also register with the vertical ribs *a*. It will be apparent that these several series of ribs will impart corresponding indentations to the surface of the cheese, which will serve as guides in cutting the latter.

I do not restrict myself to the precise arrangement of ribs herein shown and described, as it is not essential to indent the bottom of the cheese. It may be found sufficient to simply form the top of the cheese with radial indentations. Hence, I reserve to myself the right to vary the number, length, and arrangement of the indentations at pleasure.

I would also have it understood that my invention applies to square cheeses, or other forms, as well as to the ordinary round cheese.

Having fully described my invention, what I claim as new, and desire to secure by Letters Patent, is—

1. A cheese-press cylinder formed interiorly with ribs or projections, substantially as and for the purpose set forth.

2. A follower for cheese-press cylinders or molds, said follower having a series of radial ribs formed on its under side, substantially as set forth.

3. The combination, with a cheese-press cylinder or mold formed interiorly with a series of vertical ribs or projections, of a follower, whose under surface is formed with a series of radially-arranged ribs registering with the vertical ribs of the cylinder, substantially as set forth.

In testimony whereof I have signed this specification in the presence of two subscribing witnesses.

GEORGE SCHUETTE.

Witnesses:
 FRED FENDER,
 MAX STAUSS.